US00RE46471E

(19) United States
(12) Reissued Patent
Barbour et al.

(10) Patent Number: US RE46,471 E
(45) Date of Reissued Patent: Jul. 11, 2017

(54) METHOD AND SYSTEM FOR ON-LINE, REAL-TIME, INTERACTIVE COLLABORATIVE VISUALIZATION

(71) Applicant: Rakuten, Inc., Shinagawa-ku, Tokyo (JP)

(72) Inventors: Beau Barbour, Los Angeles, CA (US); David Fishman, Los Angeles, CA (US); Eric Miller, South Riding, VA (US); Gregory Newman, Aliso Viejo, CA (US)

(73) Assignee: RAKUTEN, INC., Tokyo (JP)

(21) Appl. No.: 14/261,400

(22) Filed: Apr. 24, 2014

Related U.S. Patent Documents

Reissue of:
(64) Patent No.: 8,170,919
Issued: May 1, 2012
Appl. No.: 12/504,365
Filed: Jul. 16, 2009

U.S. Applications:
(60) Provisional application No. 61/081,253, filed on Jul. 16, 2008.

(51) Int. Cl.
*G06Q 30/00* (2012.01)
*G06Q 10/10* (2012.01)

(52) U.S. Cl.
CPC ..... *G06Q 10/10* (2013.01)

(58) Field of Classification Search
CPC ..... G06Q 10/10
(Continued)

(56) References Cited

U.S. PATENT DOCUMENTS 5,617,539 A * 4/1997 Ludwig et al. ..... 709/205
5,724,522 A 3/1998 Kagami et al.
(Continued)

FOREIGN PATENT DOCUMENTS

EP 1394713 A1 3/2004
JP 2002-099840 A 4/2002
(Continued)

OTHER PUBLICATIONS

Clapperton, Free up the workspace in your mind Working alone and need a kickstart for that next project? Try sharing breakfast, offices and ideas with related businesses. Guy Clapperton explores co-location, Guy Clapperton. The Daily Telegraph. London (UK): Jul. 3, 2008. p. 3, downloaded from ProQuest Direct on the Internet on Dec. 16, 2011, 4 pages.*

*Primary Examiner* — Michelle Tarae
(74) *Attorney, Agent, or Firm* — Hubbs, Enatsky & Inoue PLLC

(57) ABSTRACT

An inventive system and method for collaborative commerce is presented. The invention comprises activating an art board, placing items onto the art board, inviting users to interact with the art board, and collaborating with the invited users. Additional features and functions include purchasing items shown on the art board, including by placing the items in a shopping cart, using e-mail, text messaging, and instant messaging to invite users, who may be chosen from a buddy list. Collaborating can be performed using voice chatting, video chatting, instant messaging, and text messaging, and includes examining reviews, ratings, reputations, and recommendations, and also includes displaying details regarding the items. In addition, reports comprising information regarding the items can be generated. A toolbar can be located on the art board and used to initiate inviting of users and placing of items onto the art board.

22 Claims, 14 Drawing Sheets

(58) Field of Classification Search
USPC ..... 715/751; 705/26.1
See application file for complete search history.

(56) References Cited

U.S. PATENT DOCUMENTS

| | | | | |
|---|---|---|---|---|
| 6,310,627 | B1 | 10/2001 | Sakaguchi | |
| 6,525,747 | B1 * | 2/2003 | Bezos | 715/751 |
| 6,766,942 | B1 * | 7/2004 | Silverbrook et al. | 235/375 |
| 6,901,379 | B1 | 5/2005 | Balter et al. | 705/27.2 |
| 6,976,220 | B1 * | 12/2005 | Lapstun et al. | 715/753 |
| 7,013,289 | B2 | 3/2006 | Horn et al. | |
| 7,016,882 | B2 | 3/2006 | Afeyan et al. | |
| 7,124,372 | B2 * | 10/2006 | Brin | 715/751 |
| 7,177,851 | B2 | 2/2007 | Afeyan et al. | |
| 7,580,867 | B2 * | 8/2009 | Nykamp | 705/26.41 |
| 7,644,427 | B1 * | 1/2010 | Horvitz et al. | 725/46 |
| 7,647,247 | B2 * | 1/2010 | Abraham et al. | 705/26.2 |
| 7,668,821 | B1 * | 2/2010 | Donsbach et al. | 707/765 |
| 7,685,017 | B2 * | 3/2010 | Matsui et al. | 705/14.19 |
| 7,685,234 | B2 * | 3/2010 | Gottfried | 709/204 |
| 7,698,660 | B2 * | 4/2010 | Sanchez et al. | 715/863 |
| 8,046,259 | B1 * | 10/2011 | Siegel et al. | 705/14.73 |
| 8,117,089 | B2 * | 2/2012 | Minsky | G06Q 30/0603 705/27.1 |
| 8,522,148 | B1 * | 8/2013 | Pry | 715/745 |
| 2001/0026262 | A1 * | 10/2001 | Van Gestel et al. | 345/156 |
| 2002/0023018 | A1 | 2/2002 | Kleinbaum | |
| 2002/0112002 | A1 | 8/2002 | Abato | |
| 2003/0088458 | A1 | 5/2003 | Afeyan et al. | |
| 2006/0085253 | A1 | 4/2006 | Mengerink et al. | |
| 2007/0002057 | A1 | 1/2007 | Danzig et al. | |
| 2007/0150368 | A1 | 6/2007 | Arora et al. | |
| 2007/0150537 | A1 | 6/2007 | Graham | |
| 2007/0239552 | A1 | 10/2007 | Sundaresan | |
| 2008/0222295 | A1 | 9/2008 | Robinson et al. | |
| 2009/0165140 | A1 * | 6/2009 | Robinson et al. | 726/26 |

FOREIGN PATENT DOCUMENTS

| | | | |
|---|---|---|---|
| JP | 2002-203167 | A | 7/2002 |
| JP | 2004-220200 | A | 8/2004 |
| JP | 2004-246585 | A | 9/2004 |
| JP | 2007-115220 | A | 5/2007 |
| KR | 10-2002-0023695 | A | 3/2002 |

* cited by examiner

METHOD AND SYSTEM FOR ON-LINE, REAL-TIME, INTERACTIVE COLLABORATIVE VISUALIZATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

[The present invention claims the benefit of U.S. provisional patent application 61/081,253 filed Jul. 16, 2008, the entire contents and disclosure of which are incorporated herein by reference.] *This is a broadening reissue of U.S. Pat. No. 8,170,919 which claims the benefit of priority of U.S. provisional patent application 61/081,253 filed Jul. 16, 2008, the entire contents of both the patent and provisional application are incorporated by reference.*

FIELD OF THE INVENTION

The present invention relates generally to e-commerce and social networking. In particular, the invention relates to a specialized visualization and interactivity interface for transforming e-commerce inventory into information sharable among members of a social networking community.

BACKGROUND OF THE INVENTION

Currently, on-line or network shopping is singularly focused. An on-line shopper, or user, can shop, e.g. navigate, an e-commerce website and add items to a personal electronic shopping cart, and/or can create a personal item list of items that friends and family may purchase for the user from that website. For example, a user could create a wedding registry having a personal item list of desired gifts and make this registry available to authorized users to review and purchase gifts from. Another on-line shopping approach is one in which a user finds a product on a web site, and bookmarks and/or attaches tags to the product. The user can then share the tagged and/or bookmarked pages with his or her friends and family.

However, these on-line shopping approaches are limited because they do not allow for any systematic feedback by the friends and family of the on-line shopper. One shopping on-line in this fashion cannot shop and simultaneously interact with other shoppers outside the e-commerce website to discuss various items initially found on the website.

There is a need for collaborative commerce on the Internet, that is, a system integrated with retailer(s) and social networks, to transform product images, and to deliver and/or transform e-commerce inventory to a social network.

SUMMARY OF THE INVENTION

The present invention advantageously provides a system and method for aggregating product information onto a visualization board from products initially resident on a network-based marketplace, such as an e-commerce web site. The products and their aggregated product information can be displayed on the visualization board in a manner enabling multiple users to interact and view groups of products from single or multiple websites, while the users are chatting and interacting on-line with each other and, if desired, traversing among web sites.

The inventive system and method comprises activating an art board, placing items onto the art board from a user's recently viewed items palette, inviting users to interact with the art board and other users' recently viewed items palettes, and collaborating with the invited users. An art board can be activated whereas user's recently viewed items can be made public to any networked user of the system. Additional features and functions include purchasing items shown on the art board, including by placing the items in a shopping cart, using e-mail, text messaging, and instant messaging to invite users, who may be chosen from a buddy list. Collaborating can be performed using voice chatting, video chatting, instant messaging, and text messaging, and includes examining reviews, ratings, reputations, and recommendations, and also includes displaying details regarding the items. In addition, reports comprising information regarding the items can be generated. A toolbar can be located on the art board and used to initiate inviting of users, creation of new art boards, and copy and/or save of art boards. The recently viewed items palette can be located on the art board and shared with other users of the system based on permissions.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

Figure 1:
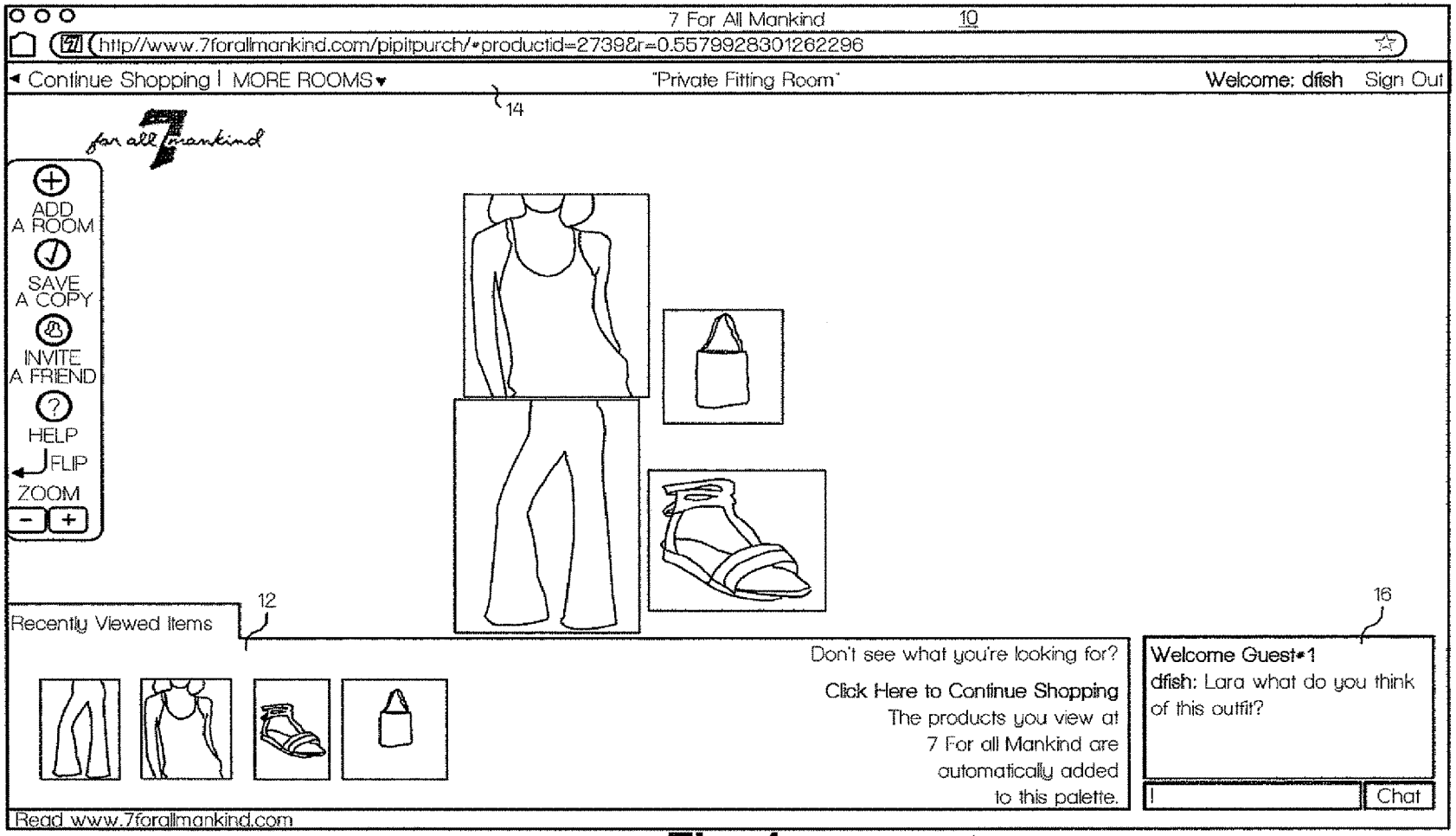
FIG. 1 shows an exemplary visualization board of the present invention initiated by user 1 (dfish)

The foregoing and other objects, aspects, features, advantages of the invention will become more apparent from the following description and from the claims.

DETAILED DESCRIPTION OF THE INVENTION

A system and method for creating and sharing e-commerce inventory among a defined on-line community via a specialized visualization and interactivity interface is presented. One embodiment comprises a network system having a client-server architecture configured for exchanging data over a network. The data exchanges may pertain to various functions, such as on-line purchases, etc., and aspects, such as managing social networks, etc., associated with the network system. The network system may include a network-based marketplace, such as an e-commerce system, where traders or users may communicate and exchange data.

The network system also includes a network-based provider having a data exchange platform, such as an art board, to provide server-side functionality via a network, e.g., the Internet, to one or more clients, including users that may utilize the network system through the network-based provider to exchange data over the network. The data exchange may include transactions such as receiving and processing data from a multitude of users. The data may include, but is not limited to, shared recently viewed products, product and service reviews, product, service, manufacture, and vendor recommendations, product and service listings, auction bids, feedback, etc.

In an exemplary embodiment, the network-based marketplace, the network-based provider including the data exchange platform, an application program interface (API) server, and a web server are coupled to, and provide programmatic and web interfaces respectively to, one or more application servers. The application servers host one or more networking applications and marketplace applications. The applications servers, in turn, are coupled to one or more database servers that facilitate access to one or more databases. The marketplace application may provide a number of marketplace functions and services, e.g., listing, payment, etc., to users that access the network-based marketplace.

This inventive system also embodies the notion of a third party application, executing on a third party server machine, as having programmatic access to the network-based marketplace via the programmatic interface provided by the API server. For example, the third party application may, utilizing information retrieved from the network-based marketplace, support one or more features or functions on a website hosted by the third party. The third party website may, for example, provide one or more networking, marketplace or payment functions that are supported by the relevant applications of the network-based marketplace. Under such embodiments, multiple network and marketplace applications, respectively, could be part of the network-based marketplace.

Various other applications, separate or as part of the network-based marketplace, may support social networking functions. These could include allowing the user to create groups of other users, affiliates, and lists of friends, and to facilitate various group communications to those lists and users, including distributing products in the network-based marketplace. While the social networking applications and the marketplace applications are discussed here as joined to form part of the network-based marketplace, in alternative embodiments, the networking applications may form part of a social networking service that is separate and distinct from the marketplace.

In addition, reputation applications may be available, separately or as part of the network-based marketplace or a social network application, to allow parties that transact utilizing the network-based marketplace to establish, build and maintain reputations, which may be made available and published to potential trading partners. For example, in the network-based marketplace, users may have no transaction history or other reference information whereby the trustworthiness and/or credibility of potential trading partners may be assessed. The reputation applications may allow a user, for example through feedback provided by other transaction partners, to establish a reputation within the network-based marketplace over time. Other potential trading partners may then reference such a reputation for the purposes of assessing credibility, trustworthiness, or the like. A user creating a shared item list and seeking reviews and recommendations associated with the listed items may therefore rely, all or in part, on another user's established credibility in determining whether or not to add that person to their community group, which may access the shared item list, and in some embodiments, make purchases based on the shared item list.

In one embodiment, the network-based marketplace includes review and recommendation applications. The social networking applications may work in conjunction with the review and recommendation applications to provide a user interface to facilitate the entry of reviews of the items on the list and recommendations for items on the list. A review may be a text entry of the community group member's opinion, a standard review form including check boxes indicating a level satisfaction, a combination of both, etc. Recommendations may include a specific type of item, a specific brand or service for a type of item, a specific retailer for the item, etc. In one embodiment, the review and recommendation applications may push a request for one or more selected members of a community group associated with the item list to submit one or more reviews and/or recommendations of one or more items of the item list.

Navigation of the network-based marketplace may be facilitated by one or more navigation applications. For example, a search application may, inter alia, enable key word searches of listings published via the marketplace. A browser application may allow users via an associated user interface to browse various category, catalogue, inventory, social network, and review data structures within the marketplace. Various other navigation applications (e.g., an external search engine) may be provided to supplement the search and browsing applications.

In order to facilitate the shopping experience associated with the marketplace, the inventive system and method includes a specialized "visualization board" functionality. FIG. 1 shows this visualization board 10, also called a storyboard or an art board. The visualization board 10 allows users to contribute, collect and visualize relevant information about products, recommendations, and themselves in an interactive session. Once activated, the visualization board 10 produces a user's Recently viewed items palette or bar 12 located at the bottom of the art board 10 over-layered to the network-based marketplace interface. Various collaborative sessions are available from the visualization board 10, the user's Recently viewed items palette 12, and/or the top navigation bar 14. In addition, communicating with other users can be performed using a chat space 16. Each user engaged in a chat session can type comments into dialogue box 16. In other embodiments, users could engage in voice and/or video chatting. Each user could be represented on the visualization board 10 by an avatar, which in one embodiment could include a picture of the user. The scope of the chat session is captured on the visualization board and stored for future recall through annotations into a database.

Figure 2:
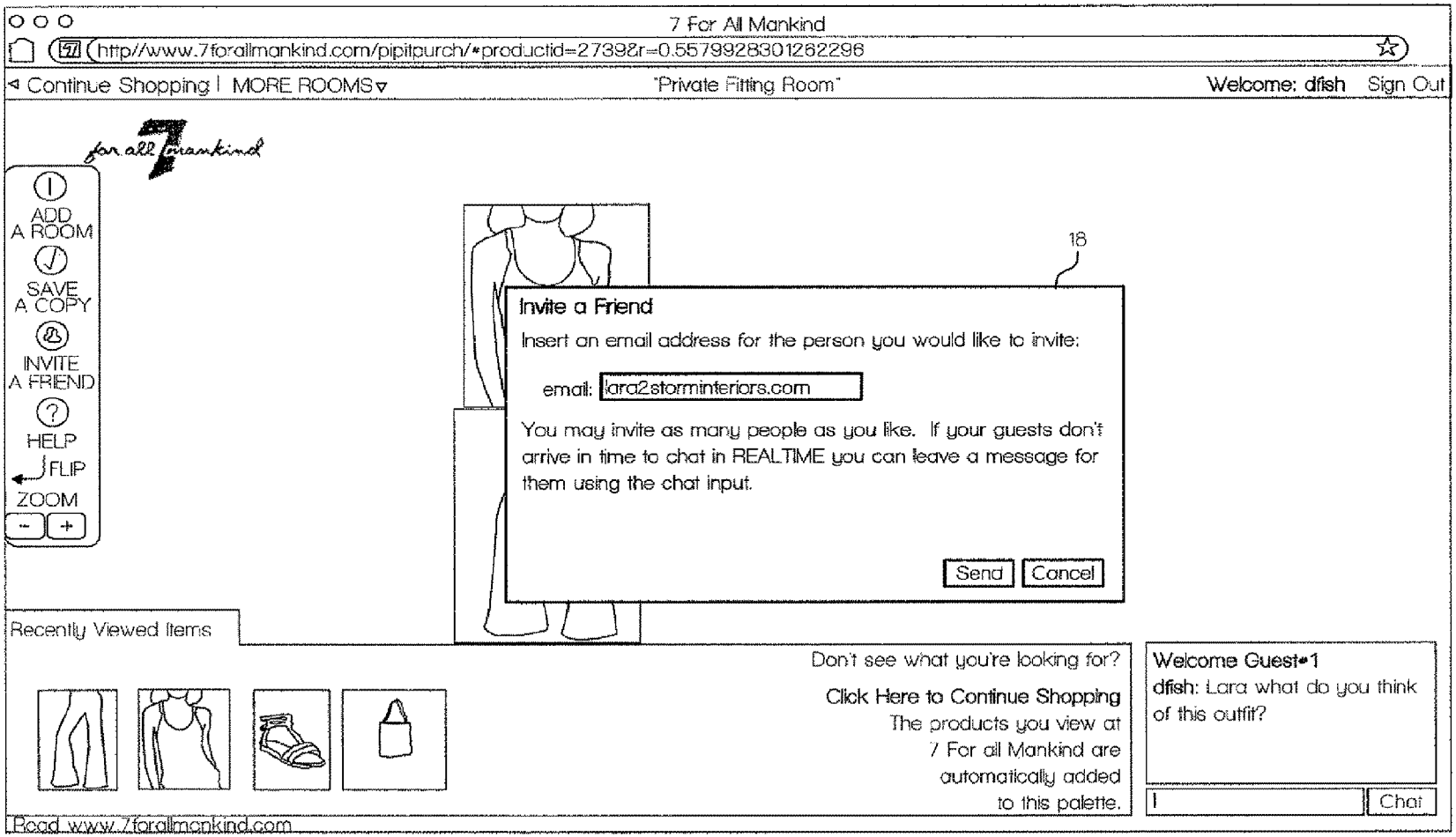
FIG. 2 shows an option to initiate various collaborative sessions in the present invention by user dfish.

FIG. 2 shows an invitation notifying a user or member of an invitation to chat and/or otherwise participate on the visualization board 10. The invitation can be by a user via email, text message, such as SMS, or instant messaging (IM). FIG. 2 shows the initial dialogue box 18 on the visualization board 10. In this box 18, a user can either enter a name of a person to chat with, or select a name from the user's list of buddies such as by using a pull-down menu or list of names.

Figure 3:
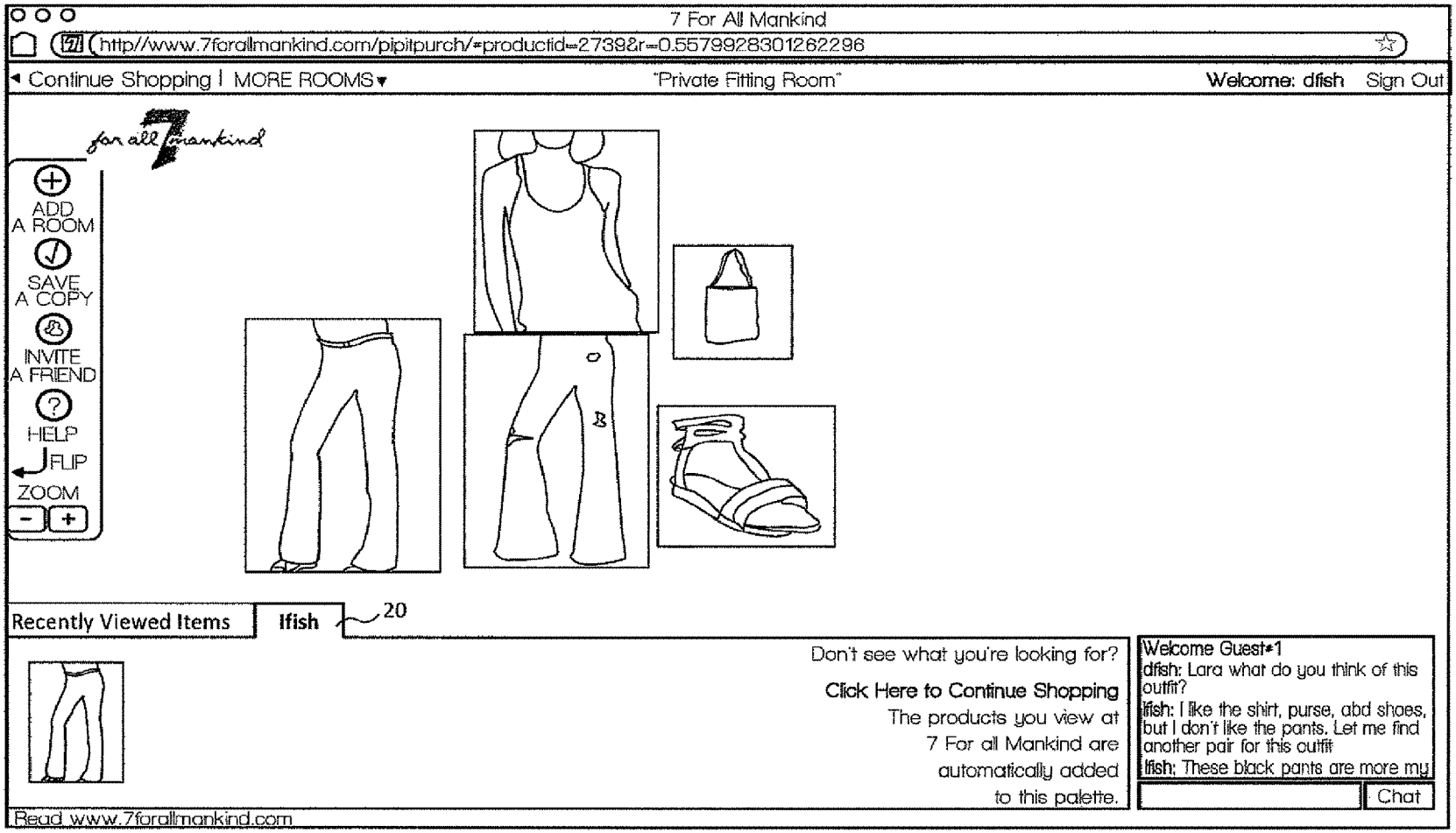
FIG. 3 illustrates the visualization board and an invited guest represented in bottom items palette.
Figure 4:
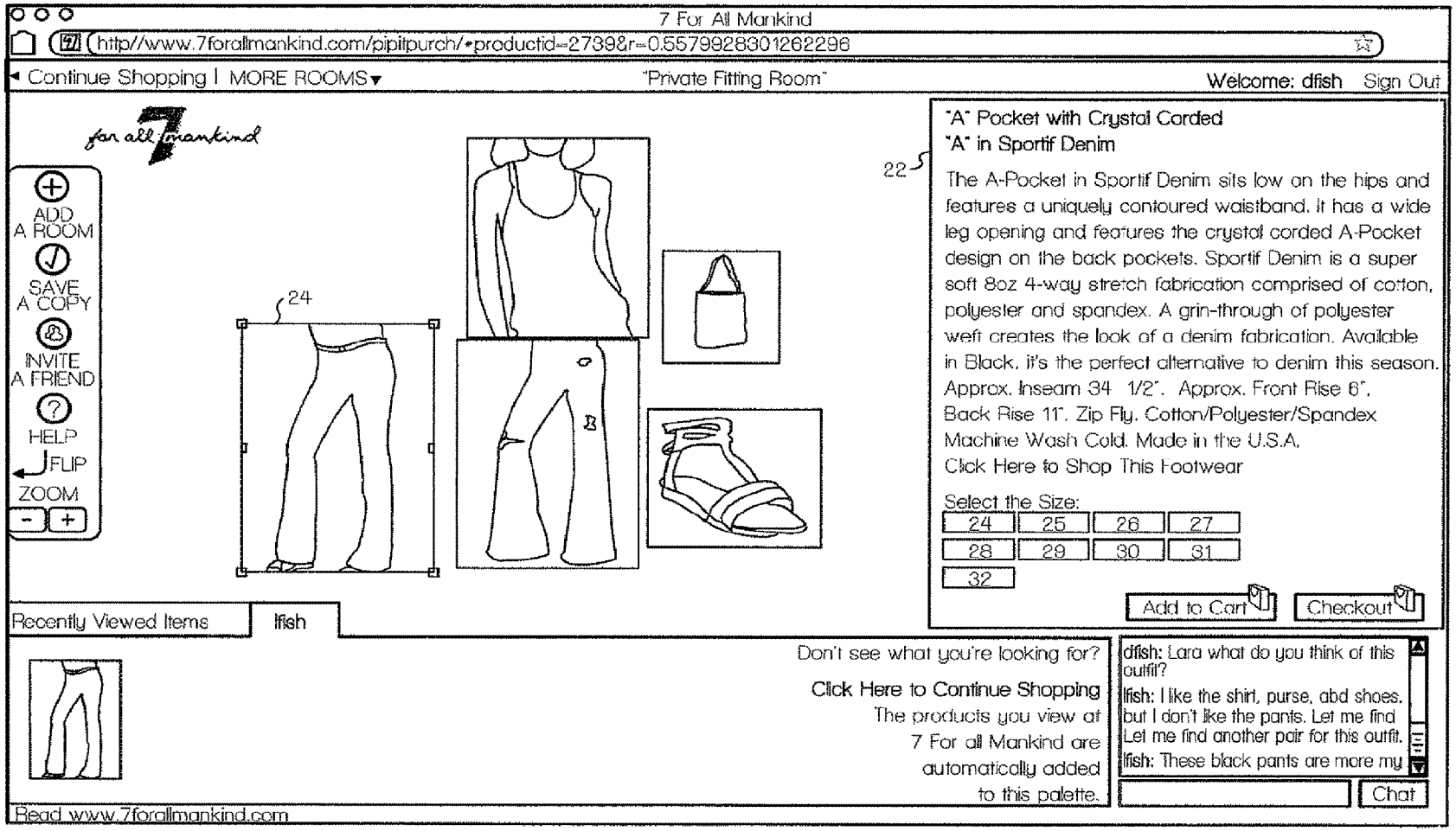
FIG. 4 illustrates the display of additional information about an item in accordance with the present invention.

FIG. 3 shows a second user, or "invited guest", and his or her palette in the bottom portion of the art board 10. As shown in FIG. 3, invited guest or user lfish has a tab 20. FIG. 4 shows the detailed shared product information 22 being displayed on the art board 10. In FIG. 4, the user has selected one pair of denim pants 24 for which detailed product information 22 is displayed. This detailed information can include a description, measurements such as inseam, front rise, etc., sizes, and/or colors.

Figure 5:
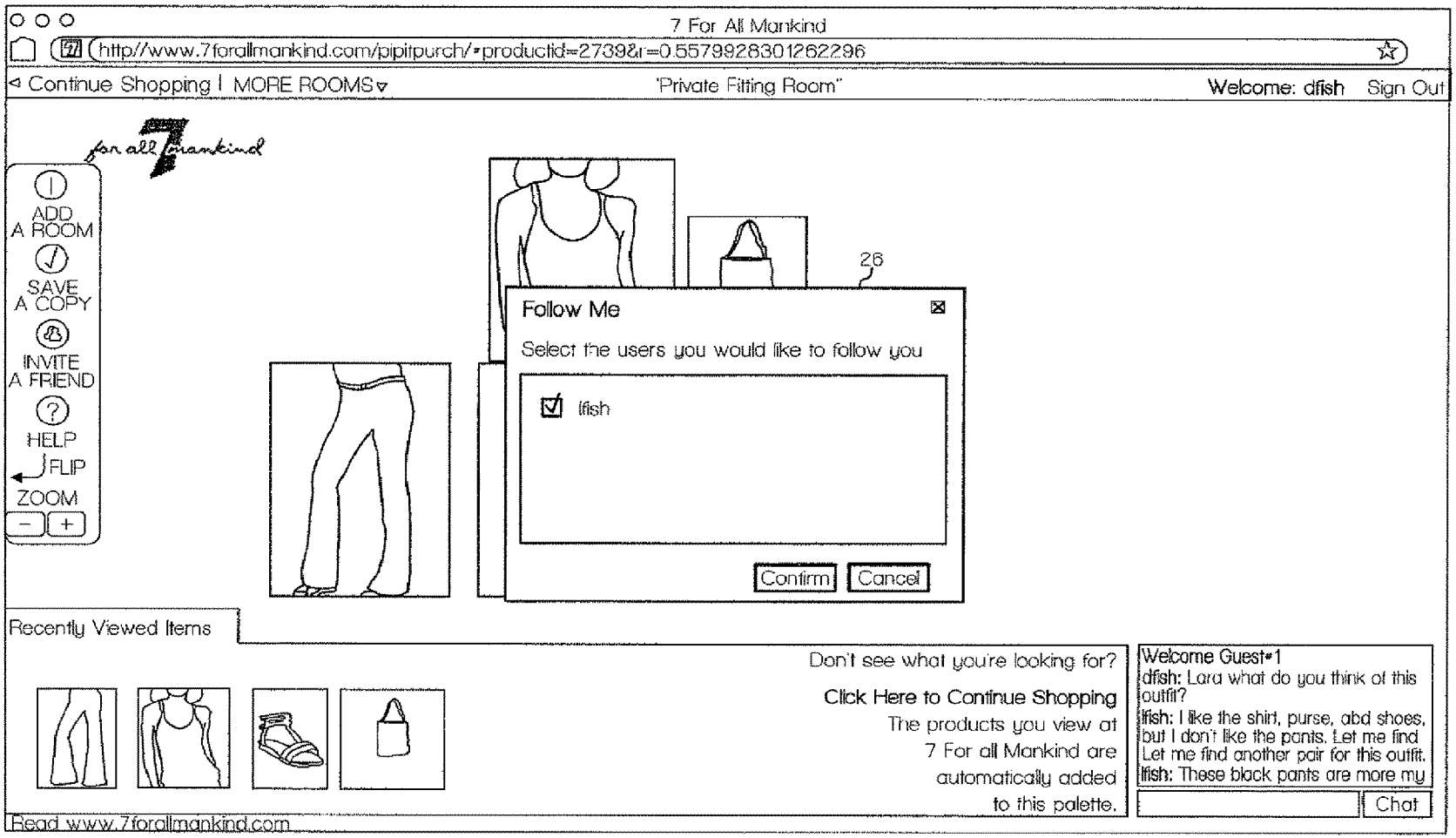
FIG. 5 illustrates initiation of a social networking function of the present invention by user dfish.
Figure 6:
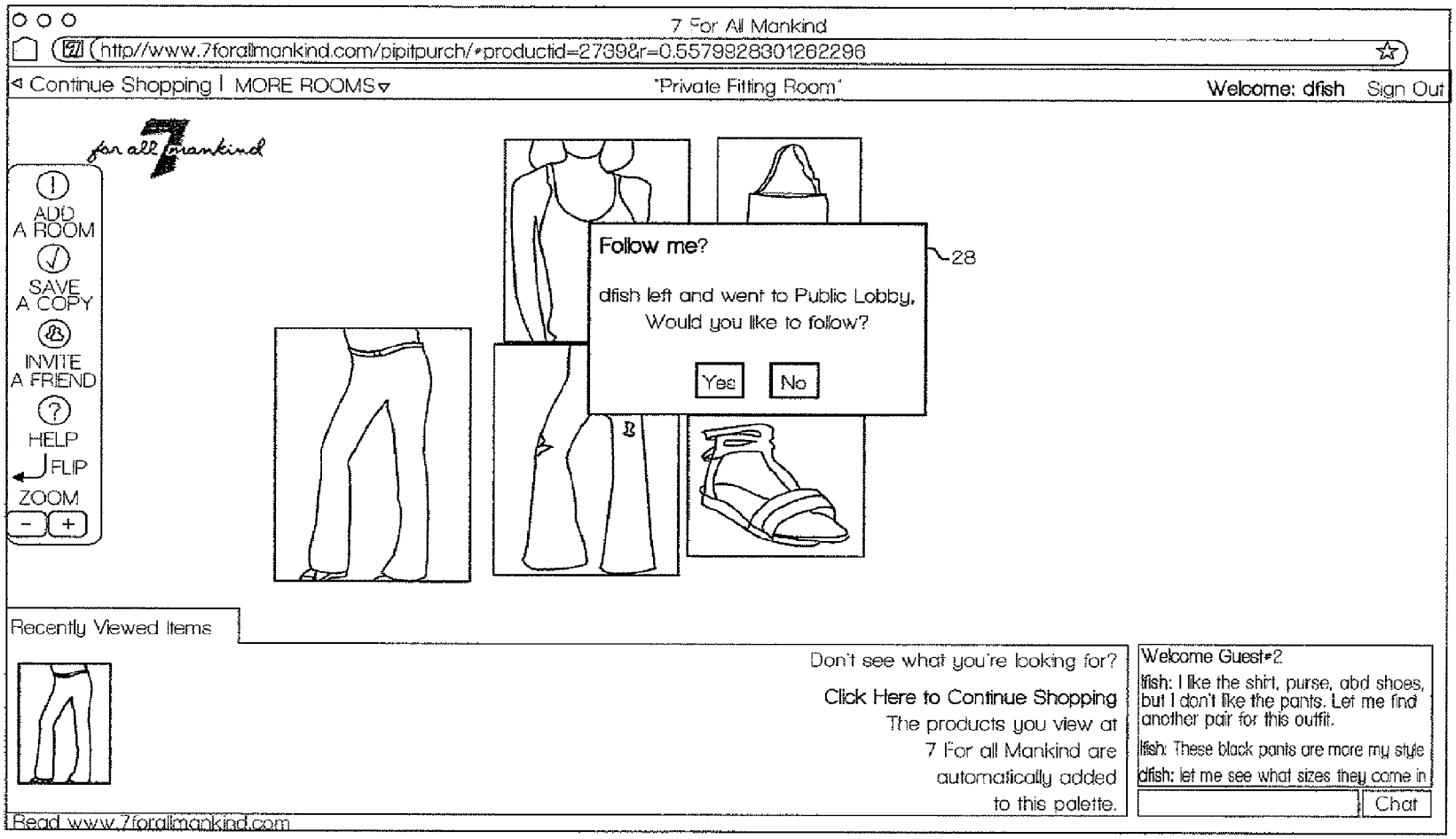
FIG. 6 illustrates an invited guest receiving the social networking invitation dialog in accordance with the present invention.

FIG. 5 shows a dialog box 26 used to initiate a social networking function. As shown in FIG. 5, a user or "leader" can ask or invite one or more other users to "Follow Me". As shown in FIG. 6, an invited user receives a dialog box 28 with a message indicating where the "leader" is inviting the user, such as "[leader/user] dfish left and went to Public Lobby". The invited user can choose to follow the leader by clicking on the YES button in the dialog box 28.

Figure 7:
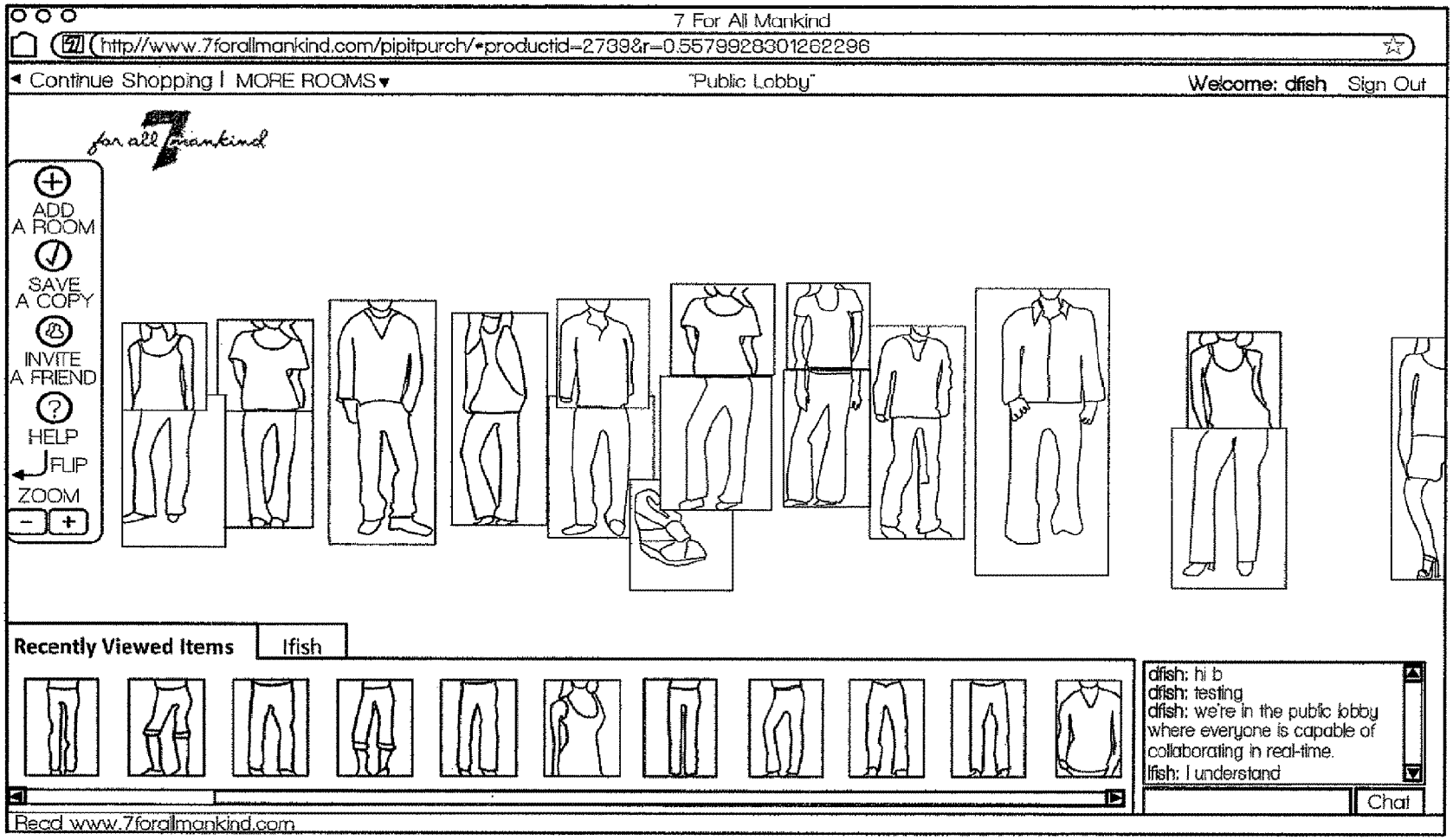
FIG. 7 illustrates a real-time collaborative art board in accordance with the present invention.

FIG. 7 shows the Public Lobby that both the leader and his followers can view. Hence, all participants in the leader's social network can share the Public Lobby art board 10.

Figure 8:
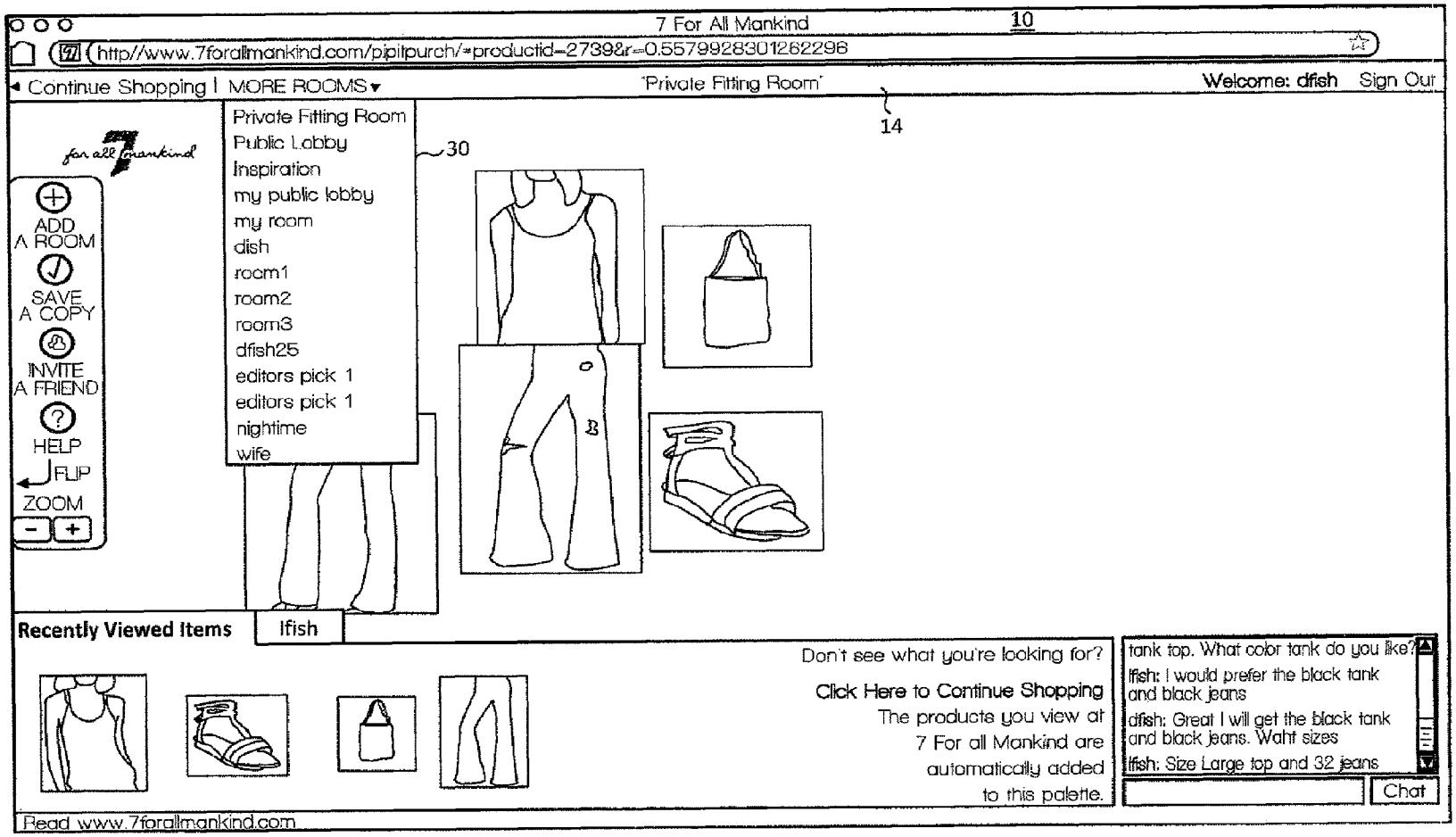
FIG. 8 illustrates a navigation menu and art board browser with which users can navigate different art boards in accordance with the present invention.

FIG. 8 illustrates a user management function. The inventive art board browser allows users to move between art boards 10. As shown in FIG. 8, a menu 30 obtained from top navigation bar 14 provides locations and/or options of places or art boards 10 among which users can move.

Figure 9:
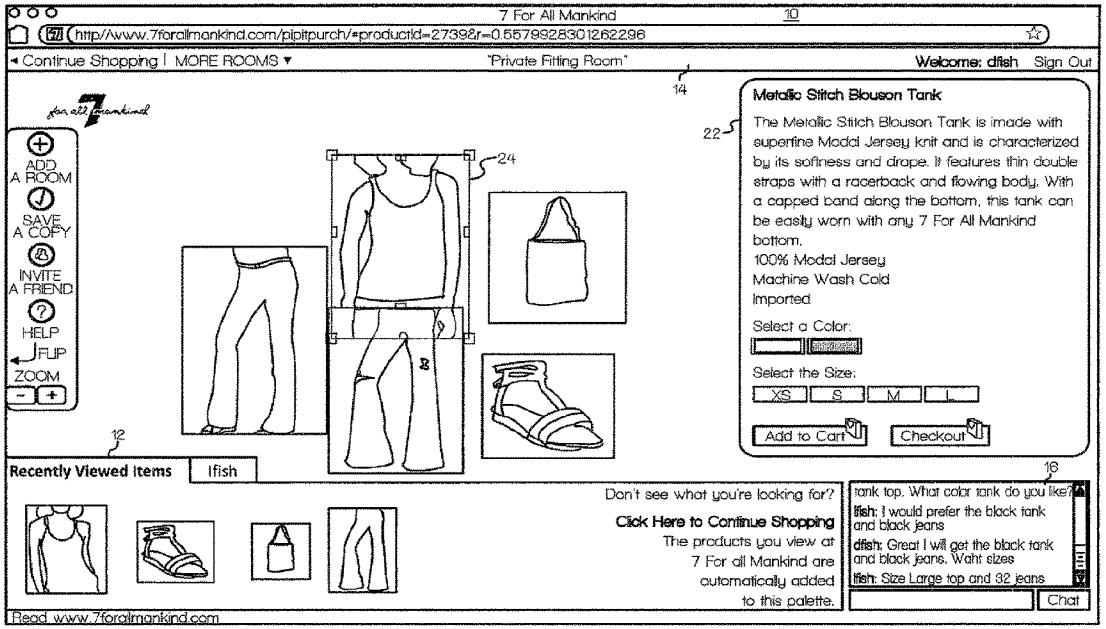
FIG. 9 illustrates a chat function from the visualization board and selection of corresponding item and display of shared product information details in accordance with the present invention.
Figure 10:
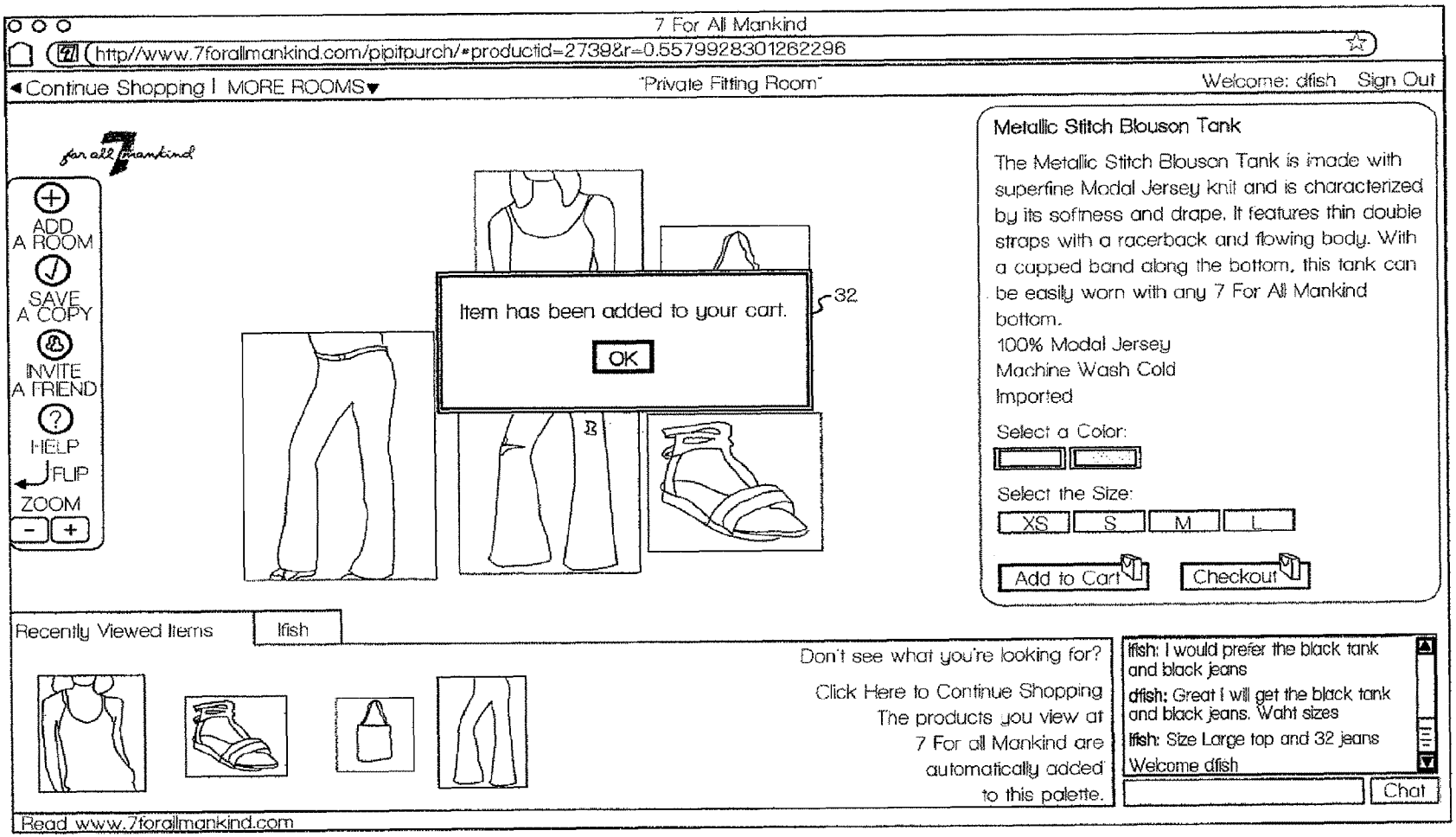
FIG. 10 illustrates successful addition of an item to network-based shopping cart.

FIG. 9 shows another example including user's Recently viewed items palette 12, top navigation bar 14, and the visualization board 10 containing five (5) items displayed as pictures. One product or item 24 is highlighted on the visualization board 10 and the product information detail window 22 is opened. Specifications are established between the records in the internal database (not shown) and the visualization board 10, enabling data transfers to occur automatically between the visualization board 10 and the databases underlying the network-based marketplace. In one embodiment, standardized Extensible Markup Language ("XML") is used through a Document Type Definition ("DTD") or some other type of XML Schema to establish a link between the visualization board 10, the product information detail window 24 and the network-based shopping cart (not shown). Such Link facilitates the addition of products to the shopping cart via the "add to cart" feature of the product detail interface shown in FIG. 9. FIG. 10 shows the message 32 displayed when an item is successfully added to the user's shopping cart.

Figure 11:
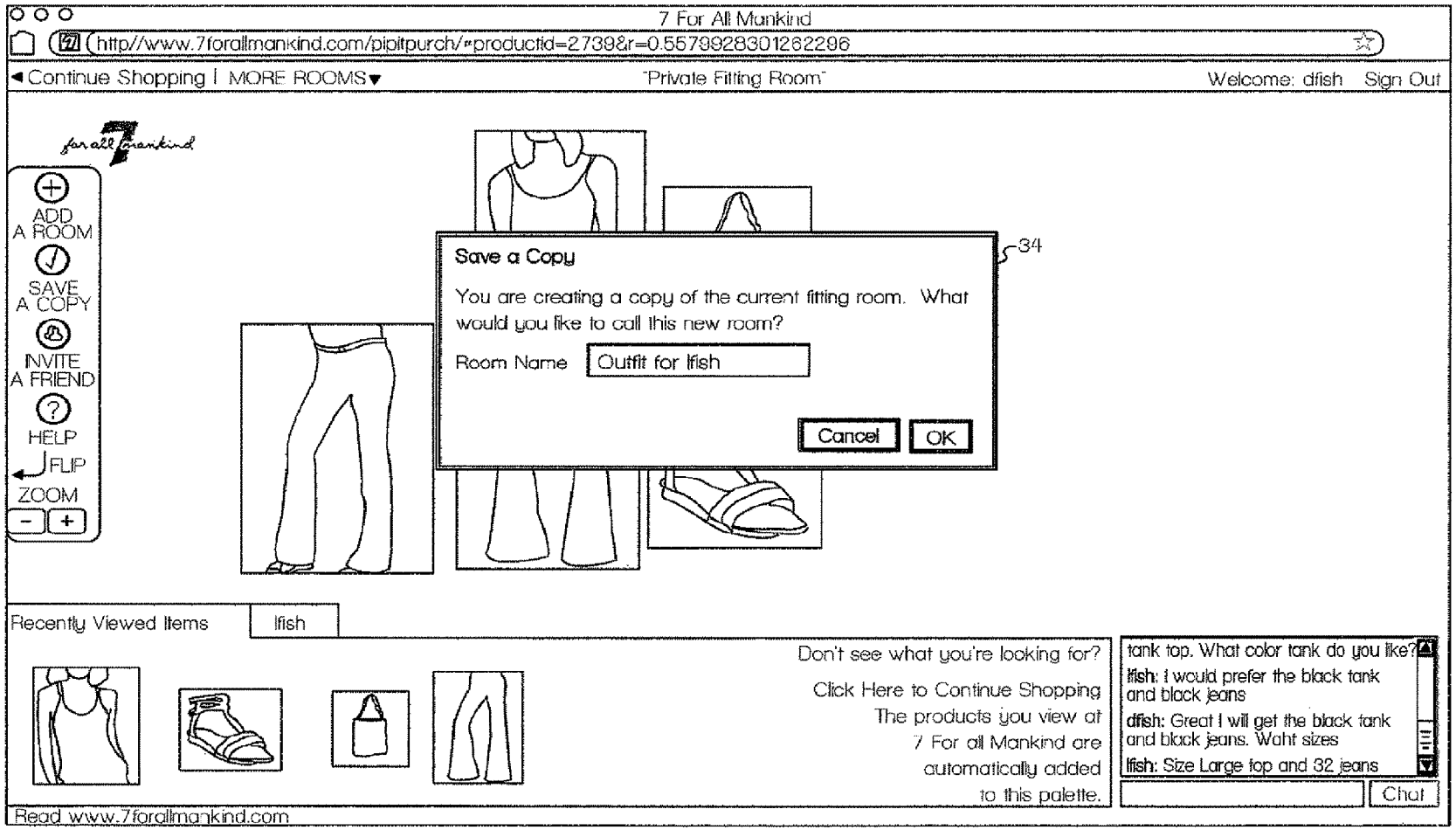
FIG. 11 illustrates saving an art board.

FIG. 11 illustrates functionality of the inventive system. Such functionality includes the ability to store and/or retrieve various art boards 10. As shown in FIG. 11, a user can save a copy or store an art board 10 using the Save a Copy dialog box 34. The user enters a name for the art board 10 in the dialog box 34, and clicks the OK button to save the art board with this name. Once saved, the art board can be retrieved from the menu or list of "more rooms" 30 provided on the top navigation bar 14.

Figure 12:
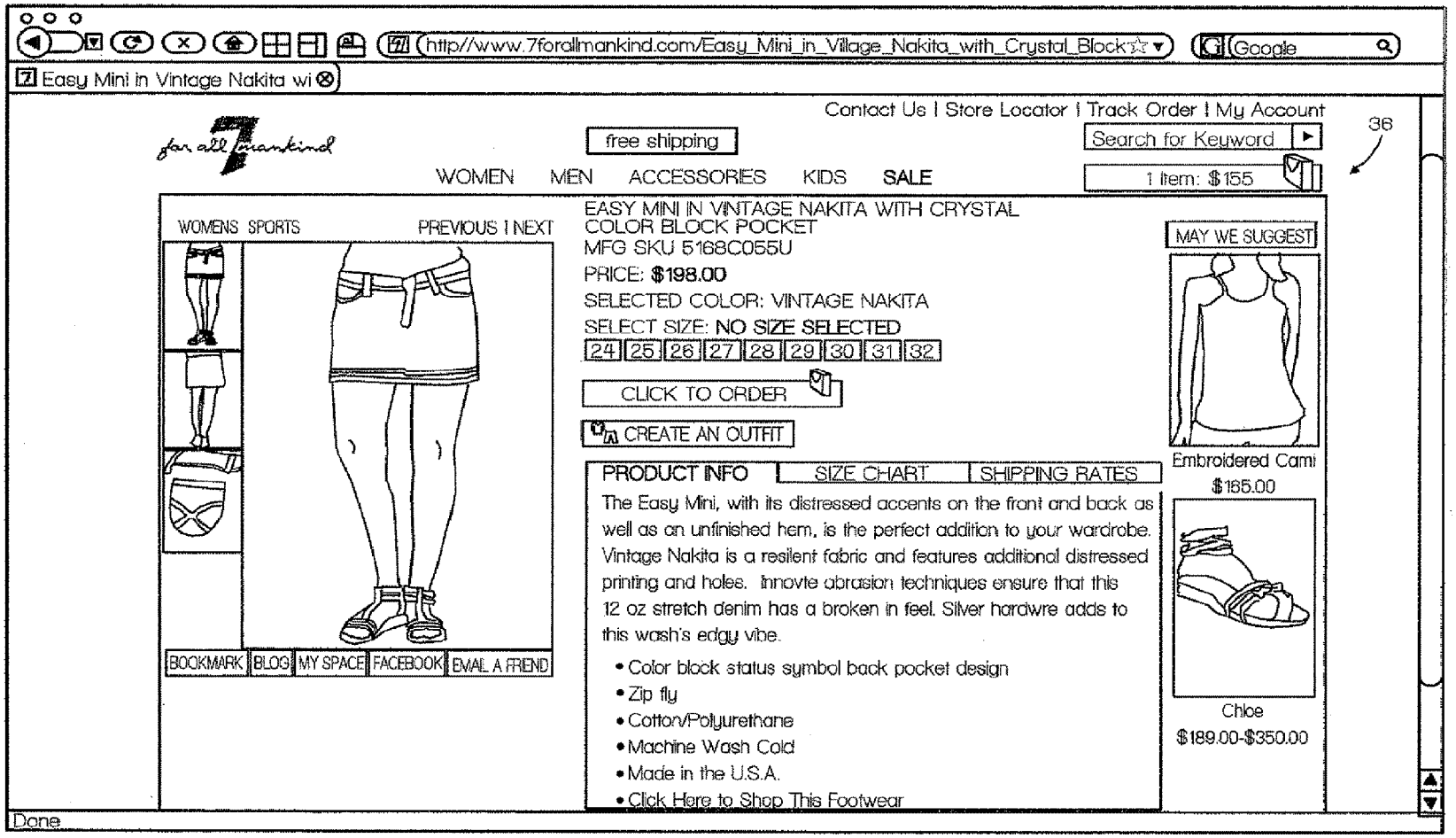
FIG. 12 illustrates a network-based computer e-commerce site.
Figure 13:
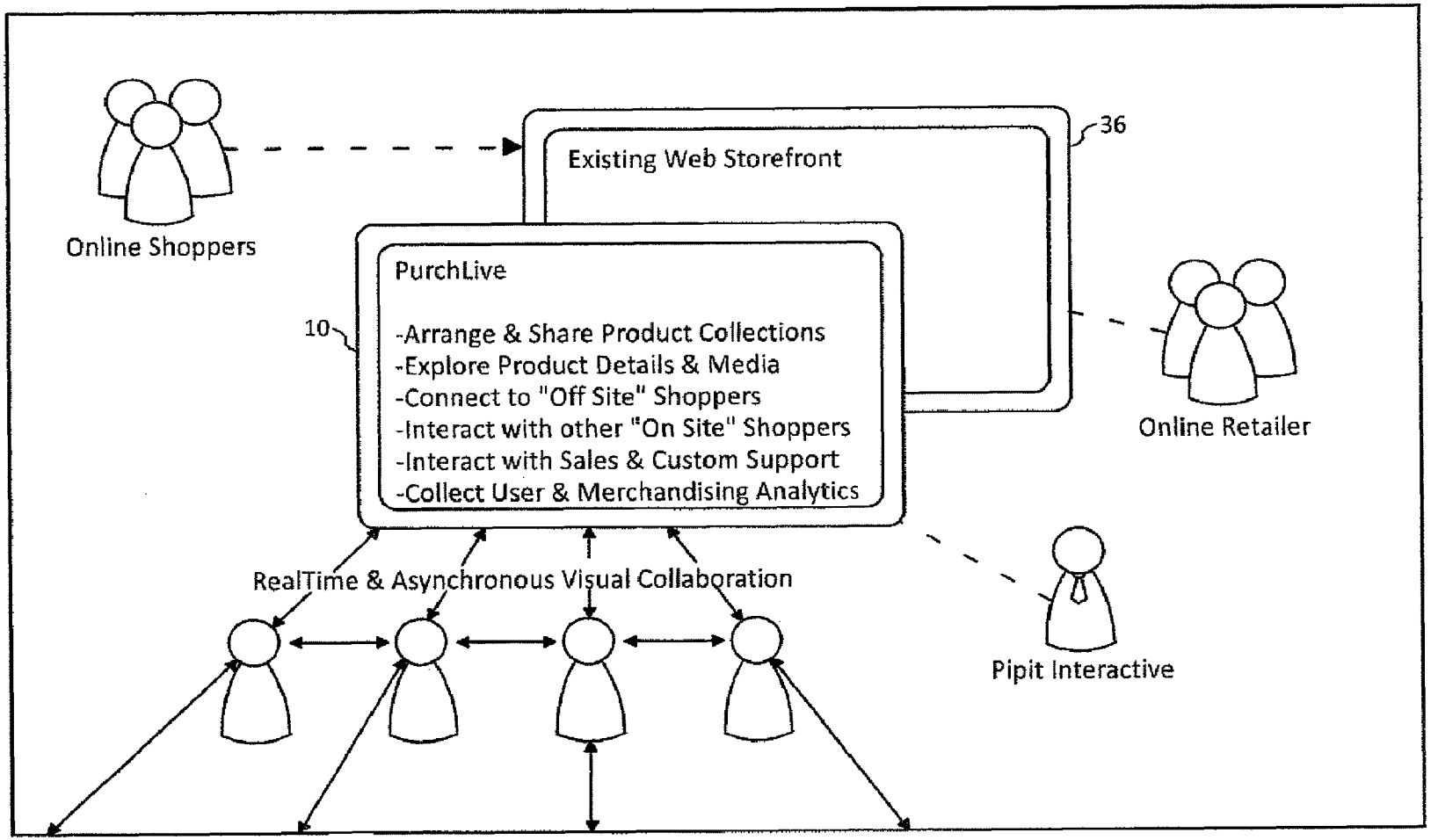
FIG. 13 is a schematic illustration of an embodiment of the present invention.

FIG. 12 illustrates a network-based e-commerce site or network-based marketplace 36 in accordance with the present invention. FIG. 13 is a schematic illustration of an exemplary embodiment of the present invention. As shown in FIG. 13, when the visualization board 10 is activated, a new user interface layer is created above the normal user interface screens associated with the network-based marketplace 36. This visualization layer visually appears as a floating window above the normal web interface associated with the network-based marketplace 36. In one embodiment, FLEX Data Services from Adobe Corporation can be used to support the presentation layer of the visualization board 10 and to provide ways to send and load data to and from server-side components without requiring the client to reload the view of the underlying network application layers.

At all times, all users see the same visualization board 10, including users invited into the session after its initialization. Any product added or removed, or any Cartesian movement of products on the visualization board 10, is automatically synchronized to the visualization boards seen by other users. This is because any manipulation of the visualization board 10 by any one user is automatically annotated into a server, e.g. the network-based provider, that synchronizes the visualization board 10 of all other users members of that session. This also applies to other data, such as annotations, product information and metadata, that any user could add.

The visualization board 10 combined with the network and marketplace applications can include one or more applications which support the network-based marketplace, and can generate and maintain relationships between products, community groups and their members' rules and roles, and transactions that may be associated with the network-based marketplace shopping cart including the products purchased through it. The associated relationships may include distribution parameters, e.g., roles and rules pertaining to the item list and associated community group(s), reviews and recommendations pertaining to the items of the item list, item attributes like model and manufacturer, or service provider of a particular item, item status, e.g., purchased, etc. Additionally, the various applications may support social networking functions, including building and maintaining the community groups created by a user, relating one or more item lists to selected community groups, and providing a shared electronic shopping cart for the community groups to purchase items from the shared item list.

On-line store or e-commerce applications may allow sellers to group their listings, e.g., goods and/or services, in the visualization boards 10 within a "virtual" store, which may be branded and otherwise personalized by and for the sellers. Such virtual storyboards 10 may also offer promotions, incentives and features that are specific and personalized to a relevant seller. In one embodiment, the listings and/or transactions associated with the virtual storyboards and their features may be provided to one or more community groups having an existing relationship with the item list creator. An existing relationship or association may include a friend or family relationship, a transactional relationship, e.g., prior sales with user, or an overall network community relationship, e.g., buyers historical transaction rating. Reputation applications may allow parties that transact utilizing the network-based marketplace 36 and the storyboards 10 to establish, build and maintain reputations, which may be made available and published to potential trading partners.

A number of fraud prevention applications may implement various fraud detection and prevention mechanisms to reduce the occurrence of fraud within the marketplace. In one embodiment, the fraud prevention applications may monitor activities of each user within the community group. For example, the item list creator may want to be informed if a member of the community group adds items to the virtual storyboard or changes shipping information, provided the member had the necessary permissions. In various embodiments, whether to monitor and the level of monitoring may depend upon the relationship to the item list creator. For example, an indirect relationship may be more heavily monitored than a direct relationship.

Messaging applications may be used for the generation and delivery of messages to users of the network-based marketplace 36. Messages can, for example, advise the visualization board creator and members of the community groups associated with an item list of the status of the various items on the list, e.g., already purchased, etc. In one embodiment, the messaging applications may be used in conjunction with the social networking applications to provide promotional and/or marketing information to the community members associated with the item list to assist them in finding and purchasing items on the visualization board 10.

A reporting application connected with the virtual storyboard 10 can compile statistical data relating to the products, selection, choices, and/or preferences of users with respect to selecting products and/or combinations. A ranking system could be created whereby such information is compiled statistically and made available to merchants for trend analysis. Additionally such information could be combined with "recommendation engines" to suggest products automatically or manually. In one embodiment, such recommendation engine could include a collaborative filtering engine that catalogs and indexes similar users with their choices of products and recommends the choices of one similar user to the others.

A user table may contain a record for each registered user of the network-based marketplace, and may include identifier, address and financial instrument information pertaining to each such registered user. In one embodiment, a user operates as an item visualization board creator or a member of a community group, including associated operations pertaining to the rules and roles, created by the visualization board creator. A user may also operate as a seller, a buyer, or both, within the network-based marketplace. The tables may also include a visualization board table that maintains listing or item records for goods and/or services created by a visualization board creator. In one embodiment, the visualization board is created for sharing with a community group defined, at least in part, by the visualization board creator.

Furthermore, each listing or item record within the visualization board table may be linked to one or more electronic shopping cart records within a electronic shopping cart table and to one or more user records within the user table and/or a vendor table, to associate a seller or vendor and one or more actual or potential buyers from the community group with each visualization board.

A transaction table may contain a record for each transaction pertaining to items or listings for which the user defined community group rules and roles pertain to one or more items of the visualization board. For example, the visualization board creator may not want a member of a community group to be able to view, purchase, edit, etc., any or all of the items in the visualization board. In another example, rules may include an ability to purchase an item on the list, purchase one or more items using the creator's account, add to the visualization board, etc.

Additionally, the visualization board creator may want to assign roles to an entity within the community group. For example, roles may include a buyer, a reviewer, an administrator, etc. Accordingly, a rules applications and a roles applications may be used in conjunction with social networking applications to customize the visualization board to be shared within one or more community groups.

The relationship or association between the visualization board creator (user) and the members of the one or more community groups may be a direct relationship or an indirect relationship. An example of a direct relationship may be a sister, a friend, or a trusted associate user, while the indirect relationship may be a secondary entity brought in by a direct relationship.

Figure 14:
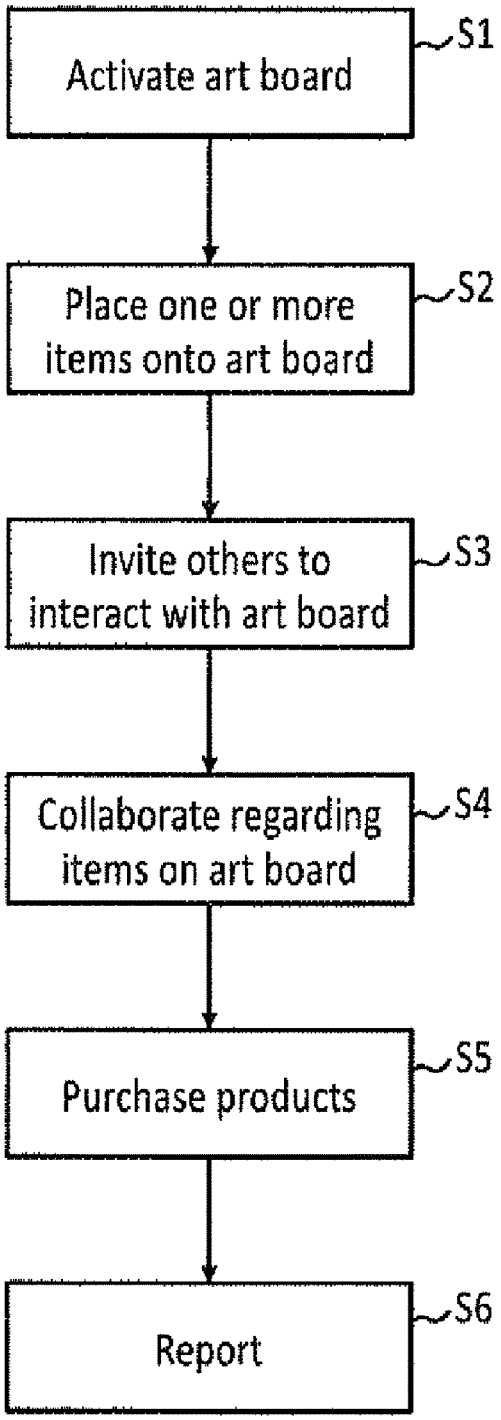
FIG. 14 is a flow diagram of an exemplary embodiment of the present invention.

FIG. 14 shows a flow diagram of an exemplary method of the invention. In step S1, a user or host activates the art board 10 from a network-based marketplace 36. In step S2, one or more items are placed onto the art board 10. In step S3, the host invites other users to interact with the art board 10. This invitation can be made via e-mail, SMS, IM or other electronic means. In step S4, users collaborate regarding art board items. This collaboration can include chatting, instant messaging, adding items to the art board, etc. In step S5, one or more users, including the host, can purchase items shown on the art board 10. In one embodiment, items are purchased by moving them to an electronic shopping cart, paying electronically, and having the items delivered to the purchaser. Optional step S6 can produce reports, such as statistical data relating to products and/or user preferences in accordance with the items on the art board.

Note that Steps S2 through S5 can be performed in any order and each step can be performed more than one time. For example, the host can invite two friends, step S3, the three users can collaborate, step S4, one or more of the users can place one or more items onto the art board, step S2, a user can purchase an item S5, etc.

The invention can be implemented as computer software or a computer readable program for operating on a computer. The computer program can be stored on computer readable medium. Various aspects of the present disclosure may be embodied as a program, software, or computer instructions embodied in a computer or machine usable or readable medium, which causes the computer or machine to perform the steps of the method when executed on the computer, processor, and/or machine.

System and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention.

What is claimed is:

1. A method for collaborative commerce comprising:

activating an art board using a processor;

placing one or more items onto said art board;

inviting one or more users to interact with the art board, at least one of said one or more invited users placing one or more additional items onto said art board; and collaborating, using the processor, among the one or more users regarding the items and the additional items placed on the art board,

*wherein the art board comprises windows including:*

*a main window for placing images;*

*a dialogue window;*

*a recently viewed items window;*

*an item information window for describing an item; and*

*wherein when two or more items are displayed on the art board and one of the two items is selected, details of the selected item are displayed in the item information window.*

2. The method according to claim 1, further comprising purchasing one or more of said items.

3. The method according to claim 2, wherein said step of purchasing comprises placing said items in a shopping cart.

4. The method according to claim 1, wherein said step of inviting is performed using at least one of e-mail, text messaging, and instant messaging.

5. The method according to claim 1, wherein in said step of inviting, the one or more users are chosen from a buddy list.

6. The method according to claim 1, wherein said step of collaborating is performed using at least voice chatting, video chatting, instant messaging, and text messaging.

7. The method according to claim 1, wherein said step of collaborating comprises one or more of ranking the items, reviewing the items, determining reputations of the items and reporting statistical data about the items.

[8. The method according to claim 1, wherein said step of collaborating comprises displaying details regarding said one or more items.]

9. The method according to claim 1, further comprising reporting information regarding the one or more items.

10. The method according to claim 1, wherein said step of placing and said step of inviting are each initiated using a toolbar.

11. A computer readable medium having computer readable program for operating on a computer for executing collaborative commerce, said program comprising instructions that cause the computer to perform the steps of:

activating an art board;

placing one or more items onto said art board;

inviting one or more users to interact with the art board, at least one or said one or more invited users placing one or more additional items onto said art board; and collaborating among the one or more users regarding the items and the additional items placed on the art board,

*wherein the art board comprises windows including:*

*a main window for placing images;*

*a dialogue window;*

*a recently viewed items window; and*

*an item information window for describing an item; and*

*wherein when two or more items are displayed on the art board and one of the two items is selected, details of the selected item are displayed in the item information window.*

12. A system for collaborative commerce comprising:

*a processor to enable* an art board [enabling collaboration] *for collaborating* among a plurality of users comprising a host user and one or more invited users;

a network-based marketplace; and a plurality of items, wherein at least one item of said plurality of items is placed onto said art board by the host user from said network-based marketplace, and at least one additional item is placed onto said art board by one or more of said invited users, and said collaboration *occurs* among the plurality of users [regards] *regarding* the items and the additional items placed onto the art board,

*wherein the art board comprises windows including:*

*a main window for placing images;*

*a dialogue window;*

*a recently viewed items window;*

*an item information window for describing an item; and*

*wherein when two or more items are displayed on the art board and one of the two items is selected, details of the selected item are displayed in the item information window.*

13. The system according to claim 12, wherein the host user invites one or more of said plurality of users to collaborate on said art board.

14. The system according to claim 13, wherein said host inviting is performed using at least one of e-mail, text messaging, and instant messaging and the one or more of said plurality of users are chosen from a buddy list.

15. The system according to claim 12, further comprising a shopping cart having items being purchased.

16. The system according to claim 12, wherein collaborating is performed using at least voice chatting, video chatting, instant messaging, and text messaging.

17. The system according to claim 12, wherein collaborating comprises one or more of ranking the items, reviewing the items, determining reputations of the items and reporting statistical data about the items.

18. The system according to claim 12, wherein collaborating comprises displaying details regarding said one or more items.

19. The system according to claim 12, further comprising reports having reporting information regarding the one or more items.

20. The system according to claim 12, further comprising a toolbar initiating placing items onto said art board and host inviting.

*21. A method comprising:*

*activating an art board using a processor by a first user;*

*placing a first item onto said art board by said first user;*

*inviting a person to interact with the art board, said invited person accepting the invitation thereby becoming a second user;*

*placing an additional item onto said art board by said second user; and*

*collaborating between the first user and the second user, using the processor, with respect to the first item and the additional item placed on the art board;*

*wherein the art board comprises:*

*a first dialogue box for collaborating using only text;*

*a main window for placing images;*

*a recently viewed items window;*

*an item information window for describing an item;*

*wherein the dialogue box is overlaid on the art board, and*

*wherein two or more items are displayed on the art board and one of the two items is selected, and wherein details of the selected item are displayed in the item information window.*

*22. A method comprising:*

*activating an art board using a processor by a first user;*

*placing a first item onto said art board by said first user;*

*inviting a second person to interact with said activated art board;*

*wherein said second person accepts said invitation, thereby becoming a second user;*

*making said art board accessible to the second user;*

*placing an additional item onto said art board by a second user; and*

*collaborating between the first user and the second user, using the processor, with respect to the first item and the additional item placed on the art board;*

*wherein the art board comprises:*

*a main window for placing images;*

*a dialogue window;*

*an item information window for describing an item;*

*a recently viewed items area, overlaid on the art board, which shows the recently viewed items, and*

*wherein two or more items are displayed on the art board and one of the two items is selected, and wherein details of the selected item are displayed in the item information window.*

*23. A system comprising:*

*a first computer for hosting an art board onto which items may be placed;*

*a second computer in communication with said first computer;*

*a third computer in communication with said first computer;*

*wherein said second computer is configured to place a first item onto said art board of said first computer;*

*wherein said second computer is configured to send an invitation to a third computer to allow access to said art board;*

*wherein said third computer is configured to place a second item onto said art board of said first computer, and*

*wherein said second computer and said third computer are configured to allow collaboration to occur on the first item and the second item placed on the art board;*

*wherein the art board comprises windows including:*

*a main window for placing images;*

*a dialogue window;*

*a detailed product information window; and*

*a recently viewed items window;*

*wherein when two or more items are displayed on the art board, and one of the items is selected, details of the selected item are displayed in the detailed product information window.*

* * * * *